United States Patent [19]

Strickland et al.

[11] Patent Number: 4,770,448
[45] Date of Patent: Sep. 13, 1988

[54] PIPE COUPLING

[75] Inventors: Albert L. Strickland; William O'Dell, both of Spring, Tex.

[73] Assignee: Landell International Company, Inc., Houston, Tex.

[21] Appl. No.: 906,384

[22] Filed: Sep. 12, 1986

[51] Int. Cl.⁴ ............................................. F16L 00/00
[52] U.S. Cl. ..................................... 285/333; 285/906
[58] Field of Search ............... 285/333, 334, 355, 390, 285/906; 403/343

[56] References Cited

U.S. PATENT DOCUMENTS

| 2,239,942 | 4/1941 | Stone et al. | 285/334.4 X |
| 3,322,446 | 5/1967 | Koziol et al. | 403/343 |
| 4,582,348 | 4/1986 | Dearden et al. | 285/390 |
| 4,588,213 | 5/1986 | Bollfrass | 285/333 X |

FOREIGN PATENT DOCUMENTS 655790 1/1963 Canada ............................... 285/333

Primary Examiner—Dave W. Arola
Attorney, Agent, or Firm—Solon B. Kemon

[57] ABSTRACT

A pipe joint coupling member for deep well pipe strings has a female thread with a slightly longer pitch than the standard API thread of the pipe end. The differences in pitch is predetermined so as to equal the elastic elongation of the pipe end threads due to loading of the made up joints when suspended in a well. The coupling, in addition to having a slightly longer thread pitch may also have a different taper or tapers than that of the standard pipe end.

6 Claims, 4 Drawing Sheets

PIPE TENSILE STRESS
DUE TO THE PITCH
INTERFERENCE UNDER
LOAD $a < a + \Delta a$

PIPE TENSILE STRESS
MALE PITCH = FEMALE PITCH
UNDER LOAD

RADIAL SEALING PRESSURE
DUE TO THE INTERFERENCE
OF MALE-FEMALE THREAD
TAPERS

Fig. 11
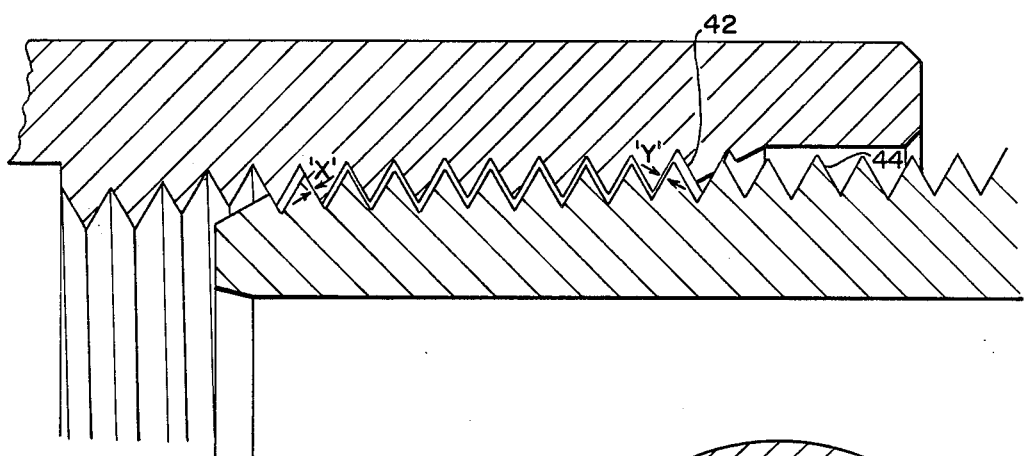
Fig. 12
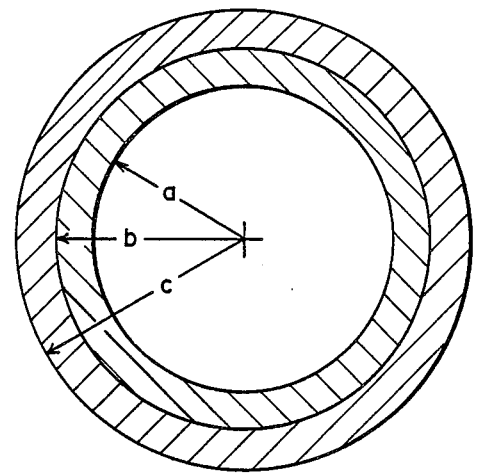
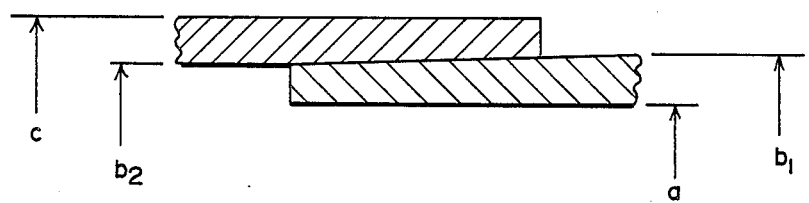
Fig. 13

PIPE COUPLING

BACKGROUND OF THE INVENTION

Production pipe joints in today's very deep oil or gas producing wells must withstand pressures at the ground level of the order of 10,000 psi and at the bottom of the wells, considerably higher. Current API standards for joints of this type are drawn on the assumption that the materials of the pipe and the coupling are infinitely rigid. In other words, they assume that there will be no elastic elongation of the pipe cross section behind each pitch of the pipe threads. In reality, however, the pipe and to a lesser degree the coupling will both be elastically and often plastically deformed under the loading imposed by modern very deep wells. Both the present API and other past designs cause the load to be borne mainly by a small number of threads at the entrance of the coupling which imposes a very high stress concentration on these few threads and causes many pipe failures. Fluid pressure sealing of standard API production pipe joints depends on a high viscosity pipe thread sealing compound which was adequate several decades ago when the API standards were adopted. Such efforts at seals have been proven to be inadequate for the pressures encountered in the very deep oil and gas wells of today.

More recently, there have been some attempts to modify these pipe joints and one such attempt involves a double tapered female thread of the coupling member so that the entrance threads of the coupling have slightly smaller thread taper than the corresponding thread taper of the male thread. In practice, however, the wedging radial pressure between the female threads of the coupling with a reduced taper and the standard API male thread of the pipe end when torqued together will deform the coupling by plastic deformation which renders the coupling unfit for reuse. At the same time, this expedient does not provide sufficient axial load bearing capacity or torquing capability and results in poor radial sealing force. By way of example, for 2⅞ inch size pipe, the API specifies a minimum tightening torque of 1800 FT/LB. With the design just described, however, plastic deformation (radial yield) of the pipe coupling limits the tightening torque to 1200 FT/LB.

In another recent coupling design the taper of the last 5 to 10 female threads is increased in an effort to obtain a metal to metal seal between the male and female threads. The difficulty with this approach has been that the end of the male pipe threads tend to yield in compression beyond the elastic limit thus rendering the joint incapable of reuse. Another difficulty with this type of joint is the increased danger of galling the threads and still not necessarily achieving a more effective fluid pressure seal.

Still another attempt to make the API tapered threaded joint pressure tight is by placing a glass fiber-filled TEFLON ring in an internal radial groove of the coupling. The radial parallel sides of the seal ring groove are supposed to confine the seal ring prior to and during the assembly operation. The difficulty with this design is that it has proved to be almost impossible to keep the TEFLON ring in place during the assembly operation. What usually happens is that the ring twists out of the parallel sided groove, the groove walls being perpendicular to the coupling axis. The assembly is necessarily a "blind" one and the faulty sealing is usually discovered only after the whole pipe string has been assembled and put into service.

To summarize the shortcomings of the prior art attempts to solve the problem, the previously known pipe coupling joints are based upon a localized, small area radial interference between the male and female threads. A localized interference of the radial threads deforms both female and male members to a point that the components cannot be reused for a second assembly. In addition, the pipe and/or the coupling are often coated from the inside with an anticorrosion laquer which tends to flake off whenever there is plastic yielding of the pipe and coupling. From a load bearing standpoint, the most highly stressed portion of the pipe is the interface of the pipe thread and the first few threads of the coupling which is also the most usual area for the origin of fatigue failure.

SUMMARY OF THE INVENTION

In accordance with the present invention, the male thread of the pipe may be the standard API tapered thread. In one embodiment, female threads within the coupling, however, are altered from the API standard to have a slightly longer pitch than the standard API male thread. This difference in pitch is predetermined, to limit the elongation of the male pipe behind each thread pitch to the exact amount of elastic stretch in order to share only its predetermined portion of the total axial load. As an additional safety feature, a fluid pressure seal is established at the interface of the male thread of the pipe and the female thread of the coupling with a polymeric deformable one piece seal ring which is housed in a forwardly slanted groove.

In a second embodiment of the present invention, the coupling has two adjacent sections of threads of substantially equal axial length lying on a stepped taper both steps of which have the same taper angle.

In a third embodiment, the coupling has two adjacent sections of threads of substantially equal axial length the innermost section having a greater taper angle than the outer.

In a further embodiment, the coupling combines the features of the second and third embodiments. Optionally, the second through the fourth embodiments may include a polymeric deformable sealing ring such as TELFON positioned in a circumferential groove on the inner surface of the coupling at substantially the axial mid-point of the threads and forming a fluid seal with the threads of the pipe end.

BRIEF DESCRIPTION OF THE DRAWINGS

FIG. 11 is an enlarged sectional view of a partially made up joint to illustrate the thread interference which occurs with coupling of the present invention;

FIG. 12 is a cross sectional view of the joint of the average thread diameter; and FIG. 13 is a diagram which together with FIG. 12 is useful in explaining the design of joints in accordance with the present invention.

DETAILED DESCRIPTION

Figure 1:
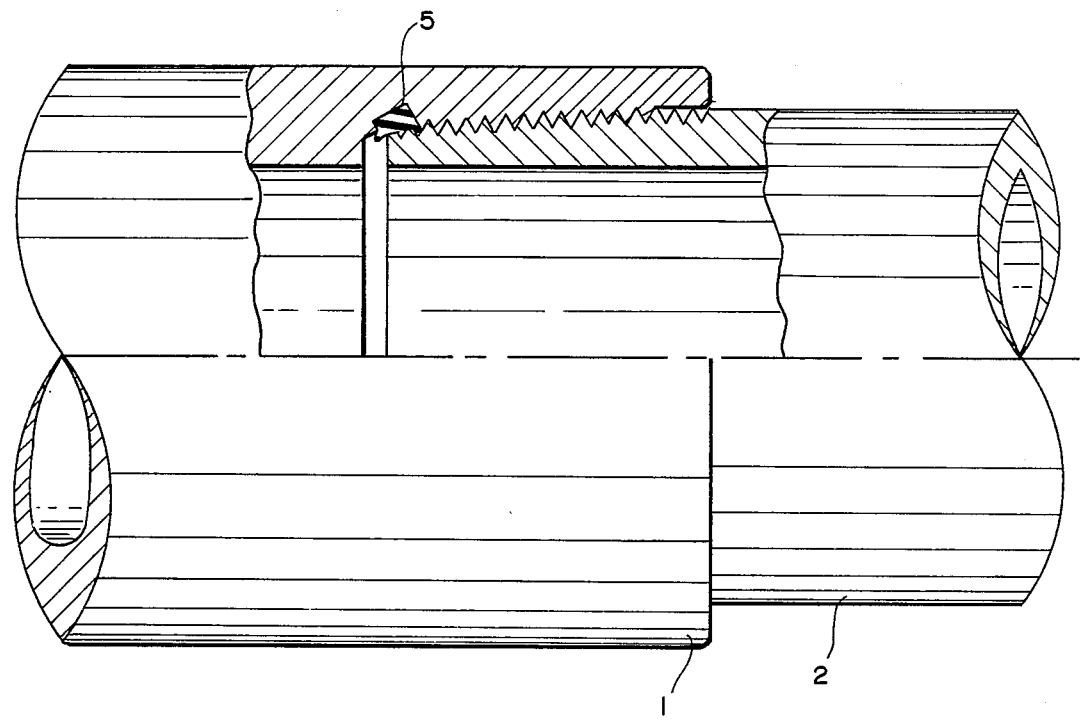
FIG. 1 is a side elevation partially in section of a pipe coupling joint in accordance with a first embodiment of the present invention.
Figure 2:
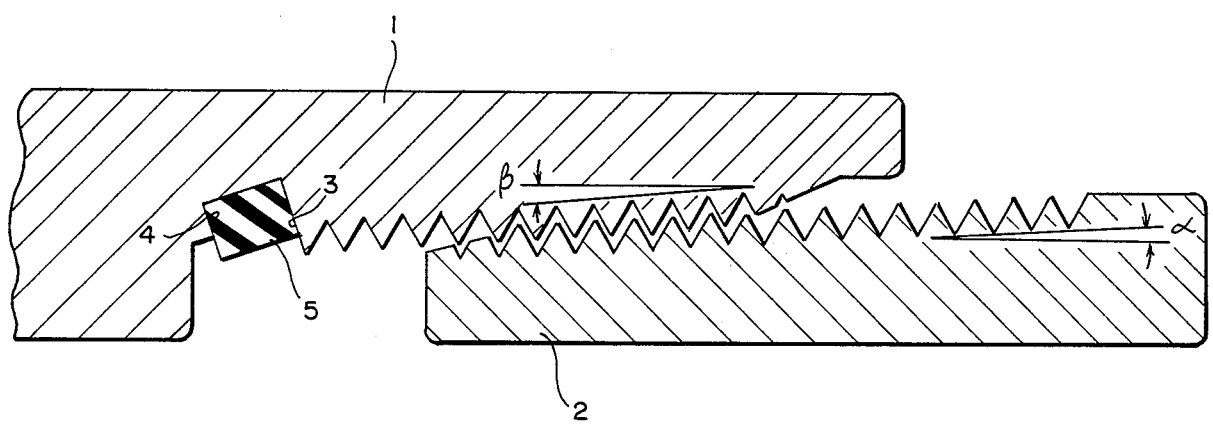
FIG. 2 is an enlarged view of the sectioned portion of FIG. 1 prior to complete assembly of the joint.

Referring first to FIGS. 1 and 2, for a description of the construction details of the progressive metal to metal thread seal in conjunction with the axial load distribution, the angle $\beta$ of the female thread in the coupling member 1 is slightly greater than the corresponding thread angle $\alpha$ of the threads of the pipe 2. After joining the coupling 1 with the pipe 2, the radial interference of the tapered threads is higher adjacent the inner-most threads of the coupling and gradually decreases toward the outer end of the coupling.

Figure 3:
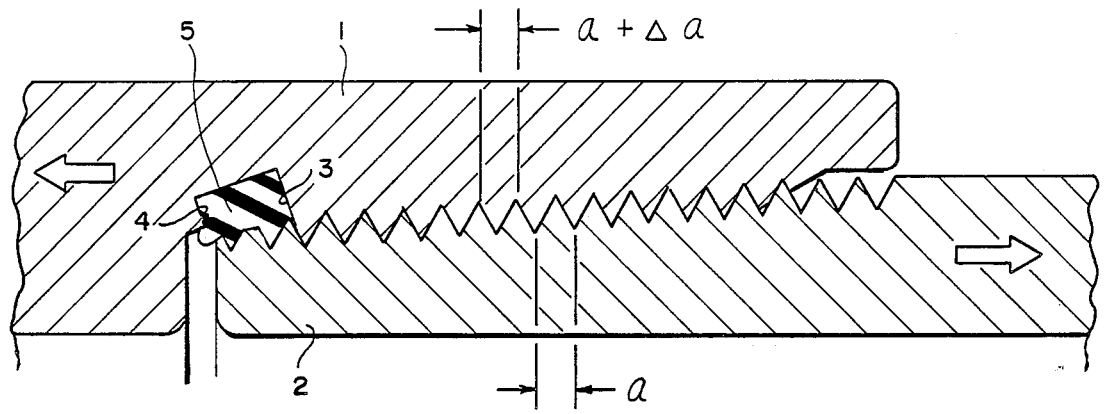
FIG. 3 is a view similar to FIG. 2 but showing the completely assembled joint.
Figure 4:
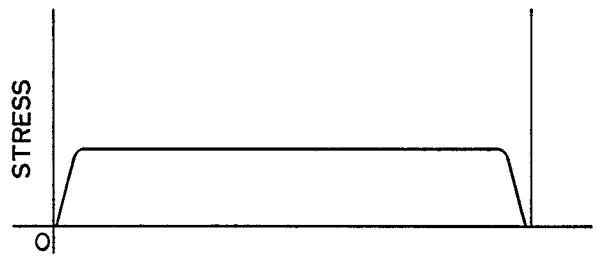
FIGS. 4, 5 and 6 are graphs to illustrate pipe tensile stress in a joint in accordance with the present invention, pipe tensile stress in joints of the prior art and radial sealing pressure due to the interference of male and female thread tapers in joints of the prior art.
Figure 5:
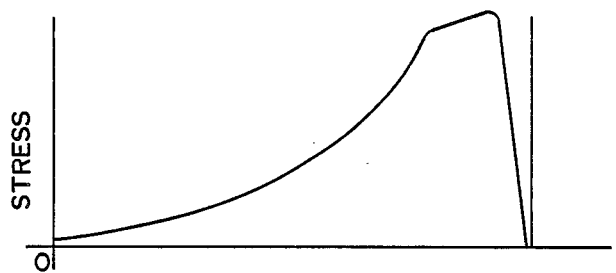
Figure 6:
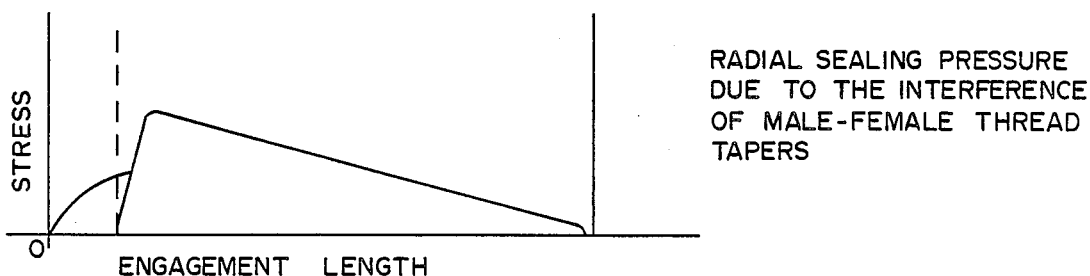

Referring next to FIG. 3, the axial load distribution between the individual thread flanks is achieved by making the female thread pitch of the coupling 1 longer by an increment of $\Delta a$ in comparison to the pitch 'a' of the API male thread on the pipe 2 by the exact amount equivalent to the stress stain of the male thread pipe material behind the thread. The increased thread pitch length of the female thread of the coupling 1 allows the material behind the male thread of the pipe 2 to elongate by an amount equal to $\Delta a$ and progressively come to engagement with the female threads of the coupling 1, thus dividing the weight of the pipe string between the load bearing threads without excess loading of any of the contact threads which in turn extends the expected fatigue life of the pipe 2.

The coupling member includes a groove substantially rectangular in cross section having side walls 3 and 4 which are inclined at an angle to the longitudinal axis of the joint. A polymeric ring 5 is positioned within this groove as shown most clearly in FIG. 2 and when the joint is fully made up as shown in FIG. 3, the ring is compressed into the groove and also into the end threads of the pipe 2.

The radial controlled progressive stress distribution of the pipe 2 results in a low distributed unit stress in the pipe behind the threaded engagement zone. This same progressive controlled engagement of the mating threads where the pitch of the female thread 'a'+$\Delta a$ of the coupling 1 is longer by the increment of $\Delta a$ than the pitch 'a' of the male thread on the pipe 2 with the progressive interference between the API taper of the male thread of the pipe and the increased taper $\beta$ of the female thread of the coupling produces a sharply recognizable initial thread locking and controlled torquing up to the specified API torque without stress concentrations at the initial areas of the thread engagement.

A pipe joint in accordance with the present invention, therefore, permits a fluid pressure seal for pressures in excess of 10,000 psi but yet provides a reusable joint by limiting the deformation of the pipe and the coupling to an elastic rather than a plastic deformation.

Figure 7:
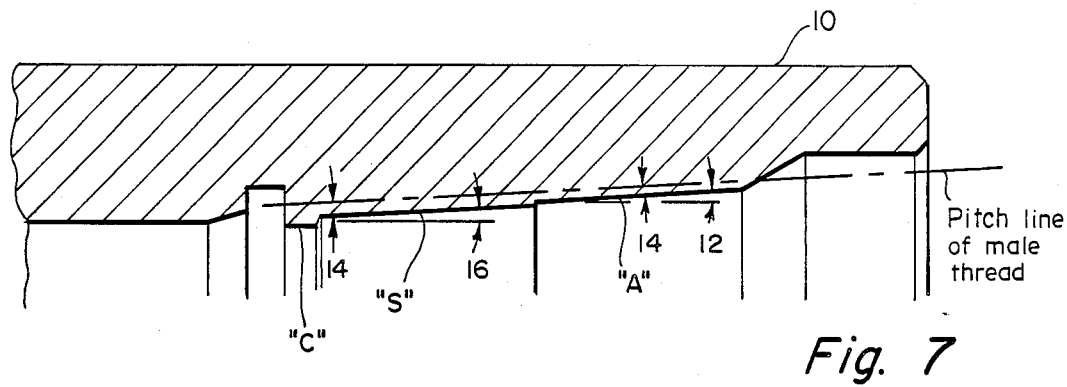
FIG. 7 is a partial sectional view omitting the axial threads of a second embodiment of the coupling.

Referring now to FIG. 7, the threaded area is divided into three radial interference zones. Starting from right to the left, the first zone 'A' of coupling 10, of FIG. 7 has a thread angle 12 similar to the thread angle of the male thread of the pipe end, the pitch line of which is superimposed on the threaded area of the coupling to and the radial interference 14 from $\frac{1}{3}$ to $\frac{1}{2}$ of the total allowable interference. The metal-to-metal radial sealing zone 'S' develops maximum hoop stress in the coupling 10, by an increased radial interference 14, but still with the same angle 16, as the pitch line angle of the male thread. The hoop stress developed in the coupling 10, at the sealing zone 'S' is generally limited to 80% of the yield strength, ($=S_y$) of the material of the coupling 10 or the male thread 1, whichever is smaller. A very high pressure seal is formed at the zone 'C' of the coupling 10, where from one (1) to three (3) final threads have a considerably reduced inside diameter, causing an extreme interference with the male threads of the pipe end. The penetration of the male thread exceeds the yield strength of the coupling 10, thread in the zone 'C', coining the female thread material against the male thread 4 and produce a true metal-to-metal seal.

Figure 8:
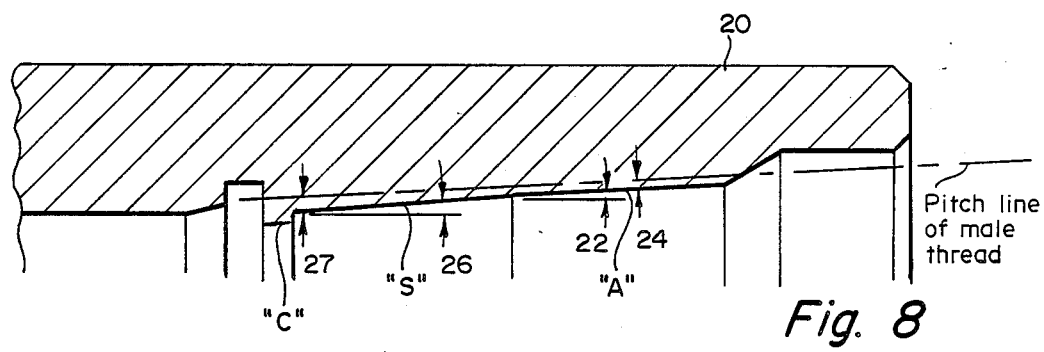
FIGS. 8 and 9 are views similar to FIG. 7 of third and fourth embodiments.

Referring now to FIG. 8, the coupling 20 has its threaded area divided into three radial interference zones. Starting from the right to the left, the first zone 'A' of the coupling 20 of FIG. 8 has a thread angle 22 similar to the thread angle of the male thread and the radial interference 24 from $\frac{1}{3}$ to $\frac{1}{2}$ of the total allowable interference. The metal-to-metal radial progressively tapered sealing zone 'S' has a larger thread angle 26 and develops a maximum hoop stress, gradually from the zone 'A' radial interference 24, to the maximum interference of the zone 'S'. The maximum hoop stress develops only at the end of the interference 27 of the zone 'S', producing a joint easier to assemble, but with the same, more localized, metal-to-metal seal. A very high pressure seal is formed at the zone 'C' of the coupling 20, wherein from one (1) to three (3) final threads have a considerably reduced inside diameter, causing extreme interference with the male thread. The penetration of the male thread exceeds the yield strength of the coupling 20 thread in the zone 'C', coining the female thread material against the male thread profile, and produces a true metal-to-metal seal.

Figure 9:
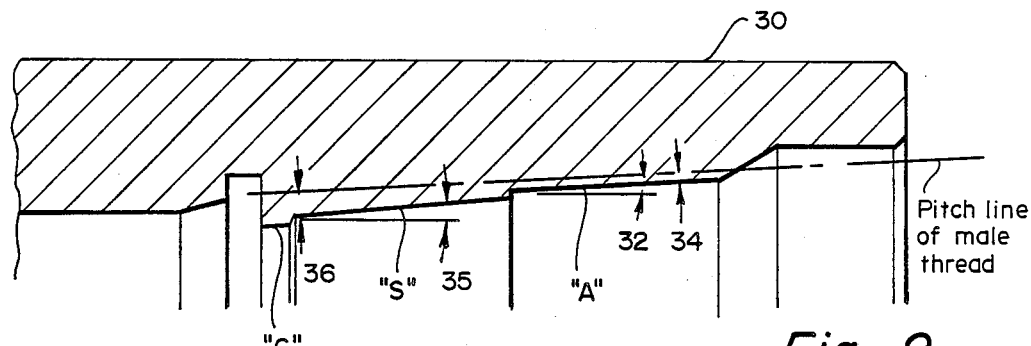

Referring now to FIG. 9, the coupling 30 also has its threaded area divided to three radial interference zones. Starting from the right to the left, the first zone 'A' of the coupling 2 of FIG. 9 has a thread angle 30 similar to the thread angle of the male thread and radial interference 34 from $\frac{1}{3}$ to $\frac{1}{2}$ of the total allowable interference, or the interference 34 starts at some lower value, and progressively increases to the starting value of the secondary interference, that ends with a greater radial interference at 34. For a progressively increasing interference of the zone 'A', the angle 38 will be greater than the angle of the male thread. The metal-to-metal radial progressively tapered sealing zone 'S' develops a maximum hoop stress gradually from the last value of the zone 'A' radial interference, to the maximum interference of the zone 'S'. The maximum hoop stress develops only at the end of the interference 36 of the zone 'S'. A very high pressure seal is formed at the zone 'C' of the coupling 30, where from one (1) to three (3) final threads have a considerably reduced inside diameter, causing an extreme interference with the male thread.

The penetration of the male thread exceeds the yield strength of the coupling 30 in the zone 'C', coining female thread material against the male thread profile and produces a true metal-to-metal seal.

Thus, in FIG. 7, there is a stepped taper of the female thread but with substantially the same thread angle in each of the two sections of the taper. In FIG. 8, there are two different tapers with a larger thread angle on the section 'S'. In FIG. 9, there is a stepped taper as in FIG. 7 but with a larger thread angle in section 'S' as in FIG. 8.

Figure 10:
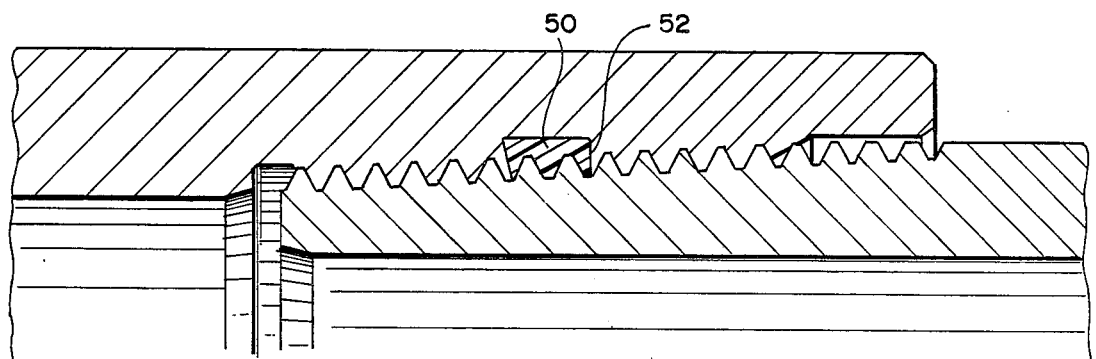
FIG. 10 is a partial sectional view of a fully made up joint showing an optional resilient sealing ring positioned in a groove in the coupling.

FIG. 10 shows a fully made up joint in accordance with the coupling structure of any of FIGS. 7-9 inclusive and with the optionally included feature of a fully confined polymeric deformable sealing ring 50 disclosed in an annular groove 52 in the coupling substantially at the axial midpoint of the coupling thread.

Referring now to FIGS. 11 and 12 and 13, FIG. 11 shows in sectional view a partially made up joint where the female thread of the coupling is of slightly longer pitch than those of the standard API pipe end which has thread 44 with a uniform taper of 0.063 inches per inch and rounded top and bottom threads and a pitch of 0.125 inches.

The female thread of the coupling 42 is manufactured with a slightly longer pitch, so that the weight of the pipe string is evenly distributed among the active threads, by the stretch of the male thread. The female thread is manufactured with an increased pitch length, equal to the stretch of the male pitch of the pipe under the axial full load (weight). Under the axial load, the male thread stretches and transfers the load evenly among the active threads of the female-male assembly.

Example:

| | |
|---|---|
| Weight of 4000 feet of pipe string | W-43,000 lb. |
| Root diameter of the male thread | $b = 2,972''$ |
| Inside diameter of the pipe | $a = 2,425''$ |
| Number of load bearing threads | $N = 10$ |
| Cross sectional pipe area at the root of average male thread | $A = 2,3168$ in$^2$ |
| Modulus of Elasticity | $E = 29 \times 10^6$ PSI. |
| Load shared by each thread $W_1 = \frac{W}{N} = \frac{43000}{10} = 4300$ lb. | |

An increase of female thread pitch required to compensate for the elongation of the male thread under the load $W_1$.

$$\Delta = \frac{W_1}{E \times A} = \frac{4300}{29 \times 10^6 \times 2,3168} = 0.000064''$$

Referring now to FIGS. 12 and 13 for a determination of the maximum hoop stress;
a=an inside radius of the male pipe=1,212'' (2,425 $\phi$)
$b_1$=an outside radius of the male pipe=1,563'' (3,125'' $\phi$)
$b_2$=an inside radius of the female pipe=1,488'' (2,975'' $\phi$)
c=an outside radius of the coupling=1,838'' (3,675'' $\phi$)
$S_y$=Yield strength of both materials=110,000 P.S.I.
$S_s$=working stress of both materials=
E=Modulus of elasticity =29×10$^6$ P.S.I.
v=Poisson's ratio =0,3
P=Failure internal pressure=
$L_1$=Length of zone "A" =0,750''
$L_2$=Length of zones "S"+"C"=0,750''
f=Coefficient of friction, steel/steel=0.4

The maximum working hoop stress $S_s$ will be set to 80% of the materials yield strength $S_y$=110,000 P.S.I.

$$S_s = \frac{S_y \times 80\%}{100} = \frac{110,000 \times 80}{100} = 88,000 \ P.S.I.$$

The radial elastic deflection of the coupling member 2, at the working stress $S_s$=88,000 P.S.I. at the zone "S" is:

$$\Delta b_2 = \frac{S_s \times b_2 \times (C^2 - b_2^2)}{E \times (C^2 + b_2^2)} \times \frac{(C^2 + b_2^2 + V)}{(C^2 - b_2^2 + V)} =$$

$$\frac{88,000 \times 1,488 \ (1,838^2)}{29 \times 10^6(1,838^2 + 1,488^2)} \times$$

$$\frac{(1,838^2 + 1,488^2 + V)}{(1,838 - 1,488^2)} = 0,004797''$$

The minimum internal pressure required to break the metal-to-metal interference seal, at the zone "S" is:

$$P = \frac{E \times b_2 \times (b_2^2 - a^2) \times (C^2 - b_2^2)}{2 \ b_2^3 \ (C^2 - a^2)} =$$

$$\frac{29 \times 10^6 \times 0,004797(1,488^2 - 1,212^2) \times (1,838^2 - 1,488^2)}{2 \times 1,488^3 \ (1,838^2 - 1,212^2)} =$$

$$9592 \ PSI$$

The minimum torque required to tighten the pipe joint, based on full interference at the zones "S"+"C", and an half (50%) of the full interference at the zone "A"

$$T = 2 \times L_2 \times b_2^2 \times f \times P + 2 \times L_1 \times b_2^2 \times f \times \frac{P \times 50}{100} =$$

$$2 \times 0,75 \times 1,488^2 \times 0.4 \times 9592 + 2 \times 0,75 \times 1,488^2 \times$$

$$0,4 \times \frac{9592 \times 50}{100} = 19113 \ \text{in. lb.} = 1592 \ \text{ft. lb.}$$

an additional torque is required to coin the higher threads of the zone "C".

Referring to FIG. 11, the male thread 44 and female threads 42 have an initial assembly interference, between the opposing thread flanks at the opposite ends, as shown on this figure at 'x' at the end of the male thread, and at 'y' at the entrance of the female thread.

After loading the coupling with the weight of the whole pipe string, the first male thread at 'x' will hold against the female thread, only with the load required $W_1$=4300 lb. to stretch the next pitch length of the male thread by 0,000064', and bring the male thread in contact with the next female thread.

This way each increment of the $W_1$-4300 lb. load is progressively transferred to each successive female thread, due to elastic stretch of each male thread pitch.

The load sharing of each male-female thread of the pipe, and coupling will avoid the stress concentration of the first thread of the coupling extending the life of the threads, and eliminating pipe fatigue failure, due to the stress concentration.

While preferred embodiments of the present invention have been herein shown and described, applicants claim the benefit of a full range of equivalents within the scope of the appended claims:

We claim:

1. For sealing engagement with a threaded pipe end having a standard API tapered thread, a coupling member having a slightly longer pitch than the pipe end, uniform throughout the joint and a thread angle which is slightly greater than the pipe end thread angle so that when the joint is fully made up, due to the interference between the two threads, there is an elongation of the threaded pipe end and a compression of the threaded coupling, the difference in pitch of the threads being equal to the elastic elongation of the male pitch under full axial load, said elongation being equal throughout the threaded length.

2. A coupling as defined by claim 1 in which the coupling thread comprises adjacent inner and outer sections of substantially equal axial length and thread angle with the outer section having a larger minimum diameter than the maximum diameter of the inner section.

3. A coupling as defined by claim 1 in which the coupling thread comprises adjacent inner and outer sections of substantially equal axial length, the inner section having a greater thread angle than the outer and a maxiumum diameter equal to the minimum diameter of the outer.

4. A coupling as defined by claim 1 in which the coupling thread comprises adjacent inner and outer sections of substantially equal axial length, the inner section having a greater thread angle and a maximum diameter less than the minimum diameter of the outer section.

5. A coupling as defined by claim 1 including means defining a circumferential groove having parallel side walls inclined to the longitudinal axis of the coupling adjacent the inner end of the thread and a polymeric deformable sealing ring substantially filling said groove and forming a fluid seal with the outer end threads of the pipe and when the joint is fully made up.

6. A coupling as defined by claim 1 including means defining a circumferential groove in the inner side wall substantially at the axial mid-point of the thread and a polymeric deformable sealing ring positioned in said groove and forming a fluid seal with the thread of the pipe end, in the fully assembled position of the joint.

* * * * *